Nov. 20, 1951 C. K. BROWN, JR 2,575,940
MIXING FAUCET

Filed Feb. 28, 1946 2 SHEETS—SHEET 1

Inventor
CHARLES KEPLER BROWN, JR.

By Howard J. Whelan
Attorney

Nov. 20, 1951 C. K. BROWN, JR 2,575,940
MIXING FAUCET

Filed Feb. 28, 1946 2 SHEETS—SHEET 2

Inventor
CHARLES KEPLER BROWN, JR.
By Howard J. Whelan,
Attorney

Patented Nov. 20, 1951

2,575,940

UNITED STATES PATENT OFFICE 2,575,940

MIXING FAUCET

Charles Kepler Brown, Jr., Fairmont, W. Va.

Application February 28, 1946, Serial No. 650,776

2 Claims. (Cl. 277—20)

This invention pertains to plumbing fixtures and more particularly to valves of the hot and cold water mixing and volume control type. In a particular form of mixing valve, the structure is made in the form of a chamber of reasonable capacity, into which extends piping having controlling valves provided to admit the individual flow of hot or cold water, but do not control the volume of water passing from said faucet. This type is especially intended for shower purposes and cannot be used for domestic lavatories or kitchen sinks. Even should it be possible to attach it to such lavatories and sinks, its spread-out of details and cumbersome appearance would make it unsuitable aesthetically for up-to-date household requirements.

It is an object of this invention to provide a new and improved lavatory water control valve that will put under instant control the amount of volume and the temperature of the water passing therefrom in a convenient manner on the lavatory itself.

Another object of the present invention is to provide a new and improved mixing valve for shower baths, lavatories and sinks combined into a single unit having individual control of the hot and cold water being brought into it, and control the amount of mixed water passing therefrom, and presenting a compact and attractive appearance.

A further object of the present invention is to provide a new and improved mixing valve for lavatories, sinks and shower baths that will have an effective operating structure for the control of temperature and volume in one unit and be capable of facile inspection, repair and interchange of parts.

For a better understanding of the invention and other objects thereof, reference is made to the appended drawings and the following description, which details a structure embodying this invention by way of illustration.

Referring to the drawings.

Similar reference characters refer to similar parts throughout the drawings.

Figure 2:
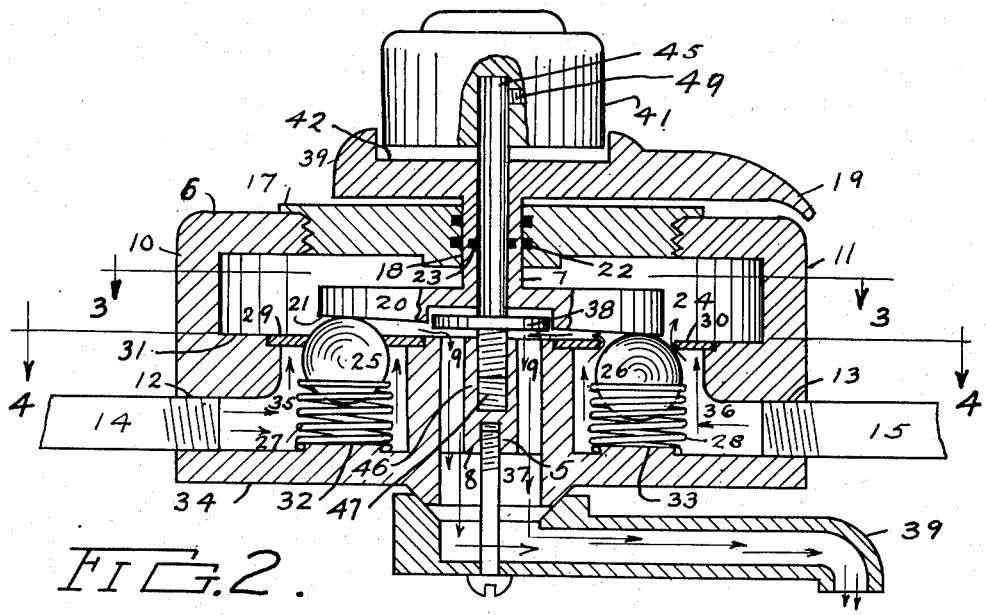
Figure 2 is a sectional view taken along line 2—2 of Figure 1.
Figure 1:
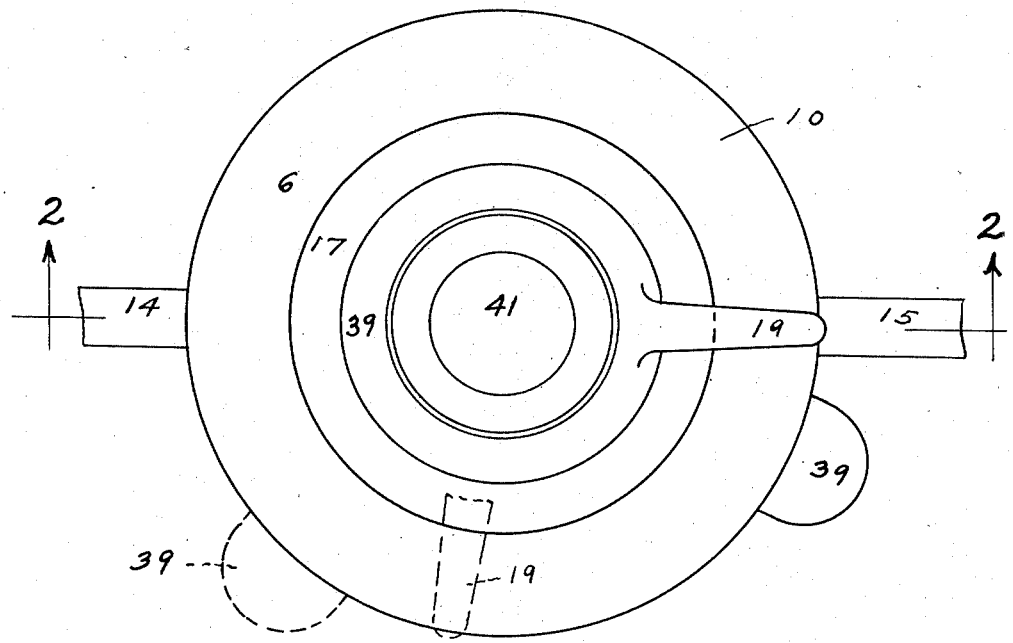
Figure 1 is a plan view of the mixing faucet, embodying this invention.
Figure 3:
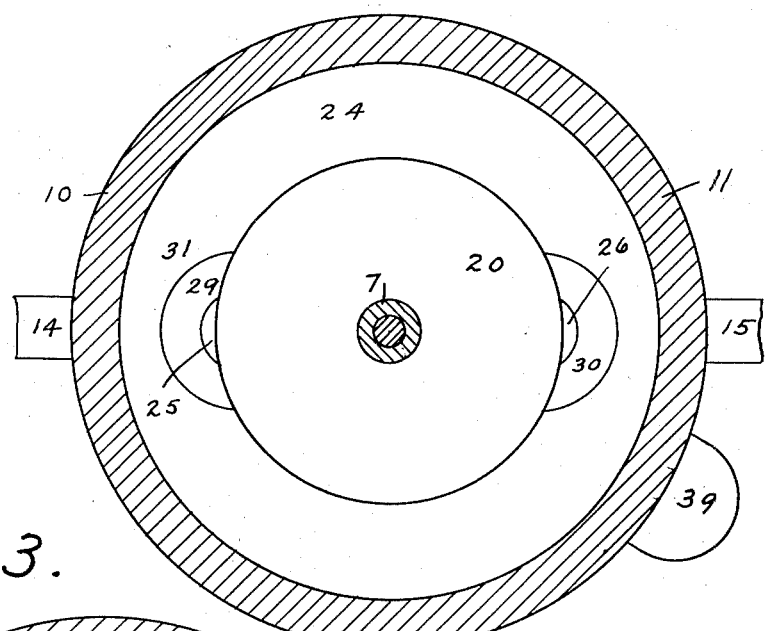
Figure 3 is a sectional view taken along line 3—3 of Figure 2.
Figure 4:
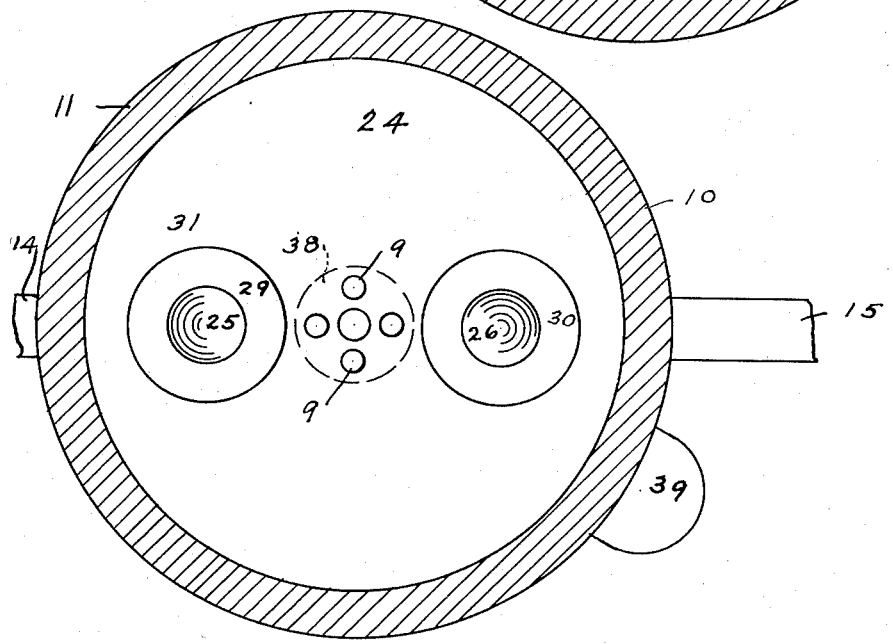
Figure 4 is a sectional view taken along line 4—4 of Figure 2.

Referring to the section shown in Figure 2, a mixing valve consists of a housing 10 of substantially circular contour with its peripheral walls 11 orificed with screw-threaded holes 12 and 13 for the placement of hot and cold water connections respectively. The connections consist of hollow arms 14 and 15 spread out laterally to couple to hot and cold water pipes respectively, rising from the direction of the floor underneath the lavatory to which the fixture is attached. The arms are so designed as to appear to be an integral part of the housing and plated suitably to afford an attractive appearance. This arrangement allows the fixture to be fed by unexposed piping termed arms, without such fact being conspicuous to the casual observer. From a mechanical point of view, the arrangement provides greater facility for installation and repairs, as well as rendering the parts accessible for cleaning and preventing corrosion. A cap 17 circular and relatively flat screws into the top wall 6 of the housing and forms a water tight joint therewith. It has a central passage 18 through it in which the operating stem 7 of the mixing valve vertically projects. The stem 7 is provided with a handle 19 at its upper end and its lower end terminates in a horizontal tapered faced control plate 20 that gradually varies in thickness in accordance with the travel predetermined for its lower operating surface 21. Stem packing 22 is used in the cap 17 around the stem 7 to keep it water tight. The plate 20 is rotatable within the mixing chamber 24 within the housing and engages against hot and cold water valve balls 25 and 26 respectively resiliently pressed upwards by springs 27 and 28. These balls fit tightly against replaceable washer seats 29 and 30 which form the hot and cold water ports. These seats are assembled from rubber encased in non-corroding metal or the like. The seats are sprung into position in the surface 31 so as to be held securely in place and against the stresses placed upon them by the balls, springs and water pressure. The springs 27 and 28 suspend the balls and guide them in their travel, and in turn the springs are aligned appropriately by stubs 32 and 33 vertically extending from the lower wall 34 of the housing. Chambers 35 and 36 permit the water from each pipe line to accumulate therein and all around the balls. The main outlet 37 is centrally located in the housing and is fitted with a spider 8, holes 9 and tapped portions 5 and 46. A cylindrical plug 38 rotatable around its vertical axis, at certain positions closes off the outlet and at others opens it. The plug 38 is operated through the stem 45 and is screw-threadably attached at 47 to the spider 8. A cylindrical handle 41 is mounted to the upper end of stem 45, by screw 49 above the housing 10. A circular plate 39 with an indicating handle 19 supports the handle 41 in its recessed top 42 and both are so arranged that they operate independently of each other. A spout 39 extends horizontally from the outlet 37 and is pivotally attached and may be swung around from one place on the lavatory to another. Packing 23 is provided for stem 45.

When the handle 19 is rotated it also revolves the disc-plate 20. Depending on the thickness of the plate presented against the balls 25 and 26, the opening of the ports is varied. This variation can vary from full opening of both ports to full closing thereof at the same time. One port may be fully opened while the other is fully closed, and so on in other degrees of opening and closing. When the water gets into the chamber 24 it is of the desired temperature and swirls towards the center and against the plate 20. This plate serves as a stabilizer of the temperature of the water because of its substantial area and relative thickness. If the main outlet valve is opened the mixed water continues out of the chamber 24 in proportion to the main outlet valve opening and at the predetermined temperature and presses through it into the spout 39, and thence into the lavatory.

It may be readily noted that the structure of the unit affords complete access to all the working parts and their assembly or replacement. The arms 14 and 15 increase the sturdiness of the device and add to its attractiveness. The arrangement of the operable parts is relatively simple and by its use of a variable plate thickness enables great latitude for the adjustment of the mixtures in the unit.

While but one general form of the invention is shown in the drawings and described in the specifications, it is not desired to limit this application for patent to this particular form or in any other way otherwise than limited by the scope thereof, as it is appreciated that other forms of construction could be made that would use the same principles and come within the scope of the appended claims.

Having thus described the invention, what is claimed is:

1. A plumbing fixture comprising in combination, a housing having a plurality of chambers therein, inlet connections positioned in said housing to connect said chambers with the incoming hot and the cold water supply, replaceable disc plates positioned in said housing, said plates having openings therethrough to connect the inlet connections with the said chambers, ball valves controlling the openings in said disc plates, a valve controlling plate having a tapered lowered face operable within the housing and with the tapered face positioned against the ball valves to vary the opening and closing of the ports for controlling the flow of water from the connections to said chambers and the mixture of the water to a predetermined temperature, a main outlet pivotally connected to the housing and in communication with said chambers for delivering the mixed water therefrom, resilient means for suspending and seating said ball valves in the disc plates, and an additional valve for controlling the volume of flow from said outlet, a handle above the housing for operating said additional valve, a handle mounted above the housing and below the first mentioned handle in predetermined alignment for operating said valve controlling plate, a stem for operating the outlet valve connected with its handle, and a hollow shank connecting the valve operating plate to its handle, said shank enclosing and guiding said stem, said stem and shank being operable independently of each other.

2. A plumbing fixture as set forth in claim 1, wherein the housing is provided with a removable cap to allow access to and removal of the valve controlling plate and ball valves.

CHARLES KEPLER BROWN, Jr.

REFERENCES CITED

The following references are of record in the file of this patent:

UNITED STATES PATENTS

| Number | Name | Date |
|---|---|---|
| 1,095,003 | Leonard | Apr. 28, 1914 |
| 1,573,210 | Widden | Feb. 16, 1926 |
| 1,656,448 | Schumacher | Jan. 17, 1928 |
| 1,690,767 | Block | Nov. 6, 1928 |
| 1,787,215 | Sinclair | Dec. 30, 1930 |
| 2,322,157 | Porter | June 15, 1943 |
| 2,334,990 | Brown | Nov. 23, 1943 |
| 2,373,702 | Moen | Apr. 17, 1945 |

FOREIGN PATENTS

| Number | Country | Date |
|---|---|---|
| 347,776 | Germany | Jan. 26, 1922 |